(12) United States Patent
Paquet et al.

(10) Patent No.: US 8,834,834 B2
(45) Date of Patent: Sep. 16, 2014

(54) USE OF CHAR PARTICLES IN THE PRODUCTION OF SYNTHESIS GAS AND IN HYDROCARBON REFORMING

(75) Inventors: Antonin Paquet, Edmonton (CA); Esteban Chornet, Sherbrooke (CA)

(73) Assignee: Enerkem, Inc., Montreal, Quebec (CA)

( * ) Notice: Subject to any disclaimer, the term of this patent is extended or adjusted under 35 U.S.C. 154(b) by 0 days.

(21) Appl. No.: 13/549,797

(22) Filed: Jul. 16, 2012

(65) Prior Publication Data

US 2013/0153826 A1 Jun. 20, 2013

Related U.S. Application Data

(60) Provisional application No. 61/572,744, filed on Jul. 21, 2011.

(51) Int. Cl.
*C01B 3/26* (2006.01)
*C01B 3/02* (2006.01)
*C01B 3/38* (2006.01)
*C01B 3/48* (2006.01)

(52) U.S. Cl.
CPC ........... *C01B 3/02* (2013.01); *C01B 2203/0233* (2013.01); *C01B 2203/0238* (2013.01); *C01B 3/38* (2013.01); *C01B 3/384* (2013.01); *C01B 3/48* (2013.01); *C01B 2203/0283* (2013.01)
USPC ......... 423/651; 423/644; 423/648.1; 423/650

(58) Field of Classification Search
USPC ................................. 423/644, 648.1, 650, 651
See application file for complete search history.

(56) References Cited

U.S. PATENT DOCUMENTS

| | | | | |
|---|---|---|---|---|
| 5,685,153 A | * | 11/1997 | Dickinson et al. | 60/648 |
| 2006/0096163 A1 | * | 5/2006 | Dickinson et al. | 44/552 |
| 2009/0093555 A1 | | 4/2009 | Stites et al. | |
| 2010/0051875 A1 | * | 3/2010 | Chornet et al. | 252/373 |
| 2010/0224835 A1 | * | 9/2010 | Chornet et al. | 252/373 |

FOREIGN PATENT DOCUMENTS

| | | |
|---|---|---|
| JP | 2008-297509 | 12/2008 |
| JP | 2010-126595 | 6/2010 |
| WO | 2009132449 A1 | 11/2009 |

OTHER PUBLICATIONS

Kumar, et al., Energies, vol. 2, pp. 556-581 (Jul. 21, 2009).
Klinghoffer, et al., Proceedings of the 19th Annual North American Waste-to-Energy Conference, pp. 1-5 (May 16-18, 2011).

* cited by examiner

*Primary Examiner* — Paul Wartalowicz
(74) *Attorney, Agent, or Firm* — Elliot M. Olstein; Raymond J. Lillie (57) ABSTRACT

Processes for producing synthesis gas from biomass in which char particles, which are formed during the production of synthesis gas from biomass, are employed as catalysts. The char particles may be used as catalysts in a gasifier or in a thermal reformer, whereby gaseous components, formed as a result of the gasification of the biomass, such as methane, light alkyl and aromatic compounds, and phenolics, as well as tar, may be reformed and/or converted into synthesis gas.

16 Claims, 6 Drawing Sheets

USE OF CHAR PARTICLES IN THE PRODUCTION OF SYNTHESIS GAS AND IN HYDROCARBON REFORMING

This application claims priority based on provisional application Ser. No. 61/572,744, filed Jul. 21, 2011, the contents of which are incorporated by reference in their entirety.

This invention relates to the use of char particles that include catalytic metals. More particularly, this invention relates to the use of char particles, produced as a result of producing synthesis gas from biomass, as catalysts in the production of synthesis gas from biomass or in the thermal reforming and/or water gas shift and/or dry reforming of gaseous streams containing a synthesis gas.

Synthesis gas, which contains hydrogen and carbon monoxide, may be produced by gasifying biomass. For example, PCT Application No. WO2009/132449 discloses gasifying a biomass-rich material in a gasifier containing a fluidized bed at a temperature that does not exceed 750° C. to produce a crude synthesis gas. The crude synthesis gas then is subjected to controlled oxidation in the freeboard section of the gasifier. Steam reforming also may be effected in the freeboard section. The resulting product includes a crude synthesis gas product and char particles. The crude synthesis gas and the char particles are passed through one or more cyclones, whereby the char particles are separated from the crude synthesis gas.

PCT Application No. WO2010/069068 discloses contacting biomass with oxygen and steam in the fluidized bed section of a gasifier and heating the biomass to a temperature of at least 500° C. and no greater than 750° C. At least a portion of the resulting oxidized biomass then is heated in the freeboard section of the gasifier to a temperature of at least 800° C. to produce a crude synthesis gas. The crude synthesis gas then may be subjected to further thermal reforming in one or more thermal reformers. The resulting product, which includes synthesis gas and char particles, is passed through a cyclone, wherein the char particles are separated from the synthesis gas.

In both of the above-mentioned applications, once the char particles are separated from the synthesis gas, the char particles are discarded.

It is an object of the present invention to employ the char particles, which are formed as a result of producing synthesis gas from biomass, as catalytic materials in producing synthesis gas from biomass, and/or in the reforming and/or water gas shift and/or dry reforming of a crude synthesis gas.

In accordance with an aspect of the present invention, there is provided a method of producing synthesis gas from biomass. The method comprises gasifying a biomass-rich material in a gasifier under conditions which produce a product comprising a gas comprising a crude synthesis gas and char particles. The char particles then are separated from the gas, and then the char particles are passed to the gasifier.

Biomass-rich materials which may be gasified in accordance with the present invention include, but are not limited to, homogeneous biomass-rich materials, non-homogeneous biomass-rich materials, heterogeneous biomass-rich materials, and urban biomass.

In general, homogeneous biomass-rich materials are biomass-rich materials which come from a single source. Such materials include, but are not limited to, materials from coniferous trees or deciduous trees of a single species, agricultural materials from a plant of a single species, such as hay, corn, or wheat, for example, primary sludge from wood pulp, and wood chips.

Non-homogeneous biomass-rich materials in general are materials which are obtained from plants of more than one species. Such materials include, but are not limited to, forest residues from mixed species, and tree residues from mixed species obtained from debarking operations or sawmill operations.

Heterogeneous biomass-rich materials in general are materials that include biomass and non-biomass materials such as plastics, metals, and/or contaminants such as sulfur, halogens, or non-biomass nitrogen contained in compounds such as inorganic salts or organic compounds. Examples of such heterogeneous biomass-rich materials include, but are not limited to, urban biomass such as municipal solid wastes (MSW) such as refuse derived fuel, solid recovered fuel, sewage sludge, used electrical transmission poles and railroad ties, which may be treated with creosote, pentachlorophenol, or copper chromium arsenate, industrial, commercial, and institutional waste, or ICI waste, and wood from construction and demolition operations which may contain one of the above chemicals as well as paints and resins.

In a non-limiting embodiment, the biomass-rich material further includes a material capable of reacting with chlorine and/or sulfur, whereby such material reacts with chlorine and/or sulfur contaminants contained in the crude synthesis gas, produced as a result of gasifying the biomass-rich material, and produces stable salts. Such materials include, but are not limited to, calcium oxide and calcium hydroxide, magnesium oxide, magnesium hydroxide, magnesium-containing silicates such as olivine (a silicate of iron and magnesium), mixtures of calcium and magnesium oxides, and mixtures of calcium oxide calcined limestone, and ash materials.

In one non-limiting embodiment, the biomass-rich material is gasified in the fluidized bed section of a gasifier at a temperature that does not exceed 750° C. and at an absolute pressure that does not exceed 10 atm, to produce a crude synthesis gas.

In a non-limiting embodiment, the biomass is gasified in the gasifier in the presence of at least one gasification agent that includes at least one oxidation agent, such as oxygen or oxygen-enriched air. In another non-limiting embodiment, the fluidization gas further includes steam and/or $CO_2$.

The fluidized bed includes an appropriate fluidized bed material. Such materials include, but are not limited to, alumina, olivine, anthracite, desulfurized petroleum coke, and in general, any other stable refractory material.

After the biomass is gasified in the fluidized bed section to produce a crude synthesis gas product which also includes tar and pyrolytic carbon fines, and char, the crude synthesis gas product is passed to the freeboard section of the gasifier, whereby tar and pyrolytic carbon fines are converted to intermediates via controlled oxidation, and the intermediates are subjected to steam reforming and/or water gas shift and/or dry reforming, whereby the intermediates are converted to CO and $H_2$. In a non-limiting embodiment, the steam reforming and/or water gas shift and/or dry reforming is effected at a temperature of from about 750° C. to about 1,200° C.

Subsequent to the steam reforming and/or water gas shift and/or dry reforming, the crude synthesis gas product is passed through one or more cyclones, whereby char, which consists of carbon-coated solid particles, is removed from the crude synthesis gas.

Such a process for the gasification of a biomass-rich material to produce a product comprising a crude synthesis gas and char is described in PCT Application No. WO2009/132449, the contents of which are incorporated by reference.

In another non-limiting embodiment, the biomass-rich material is subjected to oxidation by contacting the biomass-rich material with oxygen and steam in the fluidized bed section of a gasifier at a temperature of at least 500° C. and no greater than 750° C. to produce an oxidized biomass. The biomass-rich material may include the materials hereinabove described. The fluidized bed may include particulate materials such as those hereinabove described.

As the biomass is oxidized in the fluidized bed section of the gasifier, there is produced a partially oxidized biomass product comprising a solid carbonaceous residue, which includes char particles, and gases such as $CO_2$, steam, carbon monoxide (CO), and hydrogen ($H_2$), and vapors of intermediate species such as low molecular weight alkyl and aromatic hydrocarbons, and phenolics.

The partially oxidized biomass product then is treated in the freeboard section of the gasifier with an oxidizing gas comprising oxygen and steam to heat the biomass to a temperature of at least 800° C. to produce a product comprising a crude synthesis gas. Although carbon in the char particles, along with the partially oxidized biomass product, are reacted in the freeboard section to generate a crude synthesis gas. In one non-limiting embodiment, after the partially oxidized biomass is heated in the freeboard section of the gasifier to produce a crude synthesis gas and char particles, the crude synthesis gas and entrained char particles are passed to one or more tubular flow reactors, whereby the crude synthesis gas and char particles are heated to a temperature of from about 925° C. to about 975° C. to complete the conversion of the oxidized biomass to a crude synthesis gas.

The crude synthesis gas and any remaining char particles then are passed through one or more cyclones, whereby the char particles are removed from the crude synthesis gas.

Such a process for the gasification of a biomass-rich material to produce a product comprising a crude synthesis gas and char is described in PCT Application No. WO2010/069068, the contents of which are incorporated by reference.

In a non-limiting embodiment, the char particles, which have been separated from the crude synthesis gas, have a particle size of up to about 200 microns. In another non-limiting embodiment, the char particles have a size of up to about 150 microns. In yet another non-limiting embodiment, the char particles have a size of up to about 100 microns. In a further non-limiting embodiment, the char particles have a size of up to about 50 microns.

In a non-limiting embodiment, the char particles include at least one element selected from the group consisting of calcium, magnesium, silicon, aluminum, iron, sodium, potassium, titanium, copper, zinc, manganese, barium, nickel, strontium, tin, lead, and chromium.

In another non-limiting embodiment, the char particles include one or more salts. Such salts include, but are not limited to, $K_2CO_3$, $Ni(NO_3)_2$, $K_2SO_4$, $FeSO_4$, and combinations thereof.

In a non-limiting embodiment, metals are present in the char particles in an amount of from about 10 wt. % to about 80 wt. %. In another non-limiting embodiment, metals are present in the char particles in an amount of from about 20 wt. % to about 70 wt. %. In yet another non-limiting embodiment, metals are present in the char particles in an amount of from about 30 wt. % to about 60 wt. %.

The char particles can be passed to the gasifier by a variety of means. In a non-limiting embodiment, the char particles are fed to a conveying screw, which injects the char directly into the gasifier. In a non-limiting embodiment, the conveying screw is a compression screw to prevent syngas bypass to the cyclone. In another non-limiting embodiment, the char particles are fed to a cooling screw, which transports the char particles to an airtight rotary valve to inject the char particles into a feedstock feeding screw, whereby the char particles are combined with a biomass-rich feedstock. The feedstock feeding screw then feeds the biomass-rich feedstock and the char particles into the gasifier.

In another non-limiting embodiment, the char particles are passed from the cyclone to a feeding screw, which feeds the char particles to a steam injector, such as a venturi-type steam injector. In a non-limiting embodiment, the char particles are contacted with the steam in the steam injector at a temperature of about 150° C. The char particles then are transported with the steam to the gasifier.

The char particles are passed to the gasifier in an amount effective to catalyze the reforming and/or water gas shift and/or dry reforming of gaseous components of the crude synthesis gas formed in the gasifier. In a non-limiting embodiment, the concentration of the char particles in the crude synthesis gas is from about 50 g/m$^3$ to about 1,500 g/m$^3$. In another non-limiting embodiment, the concentration of the char particles in the crude synthesis gas is from about 50 g/m$^3$ to about 900 g/m$^3$. In yet another non-limiting embodiment, the concentration of char particles in the crude synthesis gas is from 200 g/m$^3$ to about 900 g/m$^3$. The char particles thus provide for increased conversion of tar, low molecular weight alkyl and aromatic hydrocarbons, and phenolics contained in the crude synthesis gas as the crude synthesis gas is produced in the fluidized bed section of the gasifier, and subjected to reforming and/or water gas shift and/or dry reforming in the freeboard section of the gasifier or in subsequent reforming steps.

Although the scope of the present invention is not intended to be limited to any theoretical reasoning, it is believed that, when the char particles are passed to the gasifier, at least a portion of the carbon in the char is gasified along with the biomass in the gasifier to provide a crude synthesis gas. In a non-limiting embodiment, from about 10 wt. % to about 95 wt. % of the carbon in the char is gasified. In another non-limiting embodiment, from about 20 wt. % to about 40 wt % of the carbon in the char is gasified.

As carbon in the char particles is gasified, catalytic materials contained in the char particles, such as catalytic elements and/or salts such as those hereinabove described, become exposed to gaseous tar components formed as a result of gasification of biomass. Such catalytic materials include, but are not limited to, the elements hereinabove described, as well as salts, such as potassium salts, nickel salts, and iron salts, such as $K_2CO_3$, $N(NO_3)_2$, $K_2SO_4$, $FeSO_4$, and other catalytic compounds and mixtures thereof. Thus, such catalytic materials provide for increased conversion of tar, low molecular weight alkyl and aromatic hydrocarbons, phenolics, and other components contained in the crude synthesis gas.

In accordance with another non-limiting embodiment, the char particles are separated from the crude synthesis gas in the cyclone, and then are passed through a feeding screw. The char particles then are passed to a char activation zone, wherein the char particles are contacted with a gas comprising oxygen under conditions in which at least a portion of the carbon in the char is gasified. In a non-limiting embodiment, the char particles are contacted in the char activation zone with oxygen and steam. In another non-limiting embodiment, the char particles are contacted in the char activation zone with oxygen, steam, and carbon dioxide. In another non-limiting embodiment, the char particles are contacted with air, oxygen enriched air, or carbon dioxide, or with any mixture of the above-mentioned components.

In a non-limiting embodiment, the char particles are heated in the char activation zone to a temperature of from about 400° C. to about 1,200° C. In another non-limiting embodiment, the char particles are heated in the char activation zone at a temperature of from about 500° C. to about 900° C. In yet another non-limiting embodiment, the char particles are heated in the char activation zone to a temperature of from about 600° C. to about 800° C.

In a non-limiting embodiment, from about 10 wt % to about 95 wt. % of the carbon the char is gasified in the char activation zone. In another non-limiting embodiment, from about 20 wt. % to about 40 wt. % of the carbon in the char is gasified in the char activation zone.

In still another non-limiting embodiment, prior to passing the char particles to the char activation zone, the char particles are passed to a char particle splitter zone, whereby some of the char particles are purged prior to passing the char particles to the char activation zone in order to prevent unwanted accumulation of char particles.

In a non-limiting embodiment, the char activation zone contains a fluidized bed of a stable, defined medium. In a non-limiting embodiment, the defined medium includes particles having a size of from about 100 microns to about 200 microns. Such particles include, but are not limited to, particles of petroleum coke, hard coal, aluminum, or olivine, or mixtures thereof.

In the char activation zone, the char particles are contacted with oxygen, or oxygen and steam and/or carbon dioxide, in the presence of the fluidized bed material hereinabove described. In the char activation zone, in the presence of the fluidized bed material, at least a portion of the carbon in the char particles is gasified and converted to CO and $CO_2$, and thus the converted carbon becomes part of a crude synthesis gas. Furthermore, as the carbon in the char particles is gasified, catalytic materials contained in the char particles, such as the catalytic elements and salts hereinabove described, become exposed on the surface of the char particles. Thus, the char particles have been activated, and then may catalyze the conversion of tar, low molecular weight alkyl and aromatic hydrocarbons, phenolics, and other components produced as a result of the gasification of a biomass-rich material.

Thus, upon the gasification and conversion of at least a portion of the carbon in the char particles in the char activation zone, the crude synthesis gas, formed as a result of the gasification of at least a portion of the carbon in the char particles, and the activated char particles, are passed to a gasifier, whereby such crude synthesis gas and activated char particles enter the gasifier above the fluidized bed section thereof. Thus, in the gasifier, the crude synthesis gas formed as a result of the gasification of the carbon in the char particles in the char activation zone, and the activated char particles, become admixed with the crude synthesis gas formed in the gasifier as a result of the gasification of a biomass-rich material. The activated char particles, which have been passed to the gasifier from the char activation zone, provide for increased conversion of the tar, low molecular weight alkyl and aromatic hydrocarbons, phenolics, and other components in the combined crude synthesis gas formed as a result of gasifying at least a portion of the carbon in the char particles, and as a result of gasifying a biomass-rich material in the fluidized bed section of the gasifier.

Alternatively, in non-limiting embodiments, the char particles, after being separated from the crude synthesis gas, may be passed to a steam reforming and/or water gas shift and/or dry reforming zone which is downstream from the gasifier. Thus, in accordance with another aspect of the present invention, there is provided a method of producing synthesis gas from biomass. The method comprises gasifying a biomass-rich material in a gasifier under conditions which produce a product comprising a gas which comprises a crude synthesis gas, and char particles. The char particles then are separated from the gas. The char particles then are treated. The treated char particles and the gas then are passed to a steam reforming and/or water gas shift and/or dry reforming zone, wherein the gas is subjected to steam reforming and/or water gas shift and/or dry reforming in the steam reforming and/or water gas shift and/or dry reforming zone in the presence of the char particles.

In non-limiting embodiments, the crude synthesis gas may be produced in a gasifier under conditions such as those hereinabove described.

In a non-limiting embodiment, after the char particles have been separated from the gas, the char particles are passed to a pelletizer, whereby the char particles are pelletized. In a non-limiting embodiment, the pellets have a size of from about 1/16 inch to about 5/8 inch. The resulting char pellets then are passed to a reforming and/or water gas shift and/or dry reforming zone, such as, for example, a steam reforming and/or water gas shift and/or dry reforming zone. The gas, which was separated from the char particles, also is passed to the reforming and/or water gas shift and/or dry reforming zone, whereby the gas is contacted with the char pellets which catalyze the reforming and/or water gas shift and/or dry reforming of lower alkyl hydrocarbons, aromatics, and phenoilcs which may be present in the gas.

In a non-limiting embodiment, the char particles are passed to the pelletizer and formed into char pellets. The char pellets then are passed to a reformer downstream of the cyclone in which the char pellets are formed into a packed catalyst bed. The char pellets, as they are being passed into the reformer to form the packed bed, are passed in a direction which is countercurrent to the flow of the gas comprising the crude synthesis gas that is passed through the reformer. In a non-limiting embodiment, steam and oxygen are passed through the reformer as well. The countercurrent packed bed provides catalytic activity for the water gas shift, and the reforming and/or water gas shift and/or dry reforming of methane, other hydrocarbons, and tar. In addition, the carbon in the char pellets is converted into heat and synthesis gas. In a non-limiting embodiment, the thermal reformer is heated by injecting steam and oxygen at the bottom of the packed bed, where solid carbon is oxidized to provide heat. The gas which includes the crude synthesis gas enters at a higher point along the packed bed, where it is heated to reforming temperatures by the hot oxidized carbon gas.

In a non-limiting embodiment, the gas including the crude synthesis gas and the char particles are heated to a temperature of from about 700° C. to about 1,200° C. In another non-limiting embodiment, the gas including the crude synthesis gas and the char particles are heated to a temperature of from about 700° C. to about 1,000° C. In yet another non-limiting embodiment, the gas including the crude synthesis gas and the char particles are heated to a temperature of from about 700° C. to about 900° C.

In another non-limiting embodiment, after the char particles are separated from the gas, the char particles are contacted with oxygen and steam, whereby carbon in the char particles is gasified, and availability of catalytic metal sites in the char particles is increased. In a non-limiting embodiment, the char particles are contacted with the steam and oxygen in the cyclone after the char particles have been separated from the gas comprising the crude synthesis gas. Thus, in effect, the gas comprising the crude synthesis gas is contained in a first, or upper portion of the cyclone, and the char particles are contained in a second, or lower, portion of the cyclone. The addition of the steam and oxygen to the char particles contained in the second, or lower portion of the cyclone provides a fluidized bed of char particles in a second, or lower, portion of the cyclone. The small size of the char particles make it possible for one to use a small amount of fluidization gas (i.e., steam and oxygen) which will not disrupt the function of the cyclone. The flow of steam and oxygen, and the diameter of the second portion, which may include the leg portion of the cyclone, can be adjusted so as to provide an adequate fluidization speed for the steam and oxygen while providing partial oxidation conditions which are adequate to gasify the carbon of the char particles at a desired temperature.

In a non-limiting embodiment, the char particles are contacted with oxygen and steam at a temperature of from about 400° C. to about 1,200° C. In another non-limiting embodiment, the char particles are contacted with oxygen and steam at a temperature of from about 500° C. to about 900° C. In yet another non-limiting embodiment, the char particles are contacted with oxygen and steam at a temperature of from about 600° C. to about 800° C.

In general, the char particles are contacted with oxygen and steam at a ratio of oxygen to steam that is sufficient to gasify the carbon in the char but not deactivate the catalytically active metal sites in the char. In a non-limiting embodiment, the char particles are contacted with oxygen and steam at a ratio of oxygen to steam of from about 0.1:1 to about 1:1, by volume. In another non-limiting embodiment, the char particles are contacted with oxygen and steam at a ratio of oxygen to steam of from about 0.2:1 to about 0.8:1, by volume. In yet another non-limiting embodiment, the char particles are contacted with oxygen and steam at a ratio of oxygen to steam of from about 0.3:1 to about 0.6:1, by volume.

The contacting of the char particles in the second, or lower, portion of the cyclone provides for the conversion of carbon in the char particles to synthesis gas. The synthesis gas produced as a result of the conversion of carbon in the char flows from the second, or lower, portion of the cyclone to the first, or upper, portion of the cyclone, which contains the gas previously separated from the char particles. Furthermore, the conversion of carbon in the char particles increases the surface area and grain porosity of the char, and increases the availability of catalytically active metal sites on the char particles. This increases the availability of the catalytically active metal sites on the char and activates the char. Once the char particles have been activated as a result of the conversion of carbon in the char particles, the char particles become more porous, and are transported from the second, or lower portion of the cyclone to the first, or upper, portion of the cyclone, where they again are combined with the gas that comprises a crude synthesis gas. The treated char particles and the gas then are passed to a reforming and/or water gas shift zone, such as a steam reforming and/or water gas shift zone, which may be operated at temperatures such as those hereinabove described, whereby the treated char particles catalyze the conversion of methane, lower alkyl hydrocarbons, aromatics, phenolics, and tar which may be present in the crude synthesis gas.

The invention now will be described with respect to the following drawings, wherein.

Figure 1:
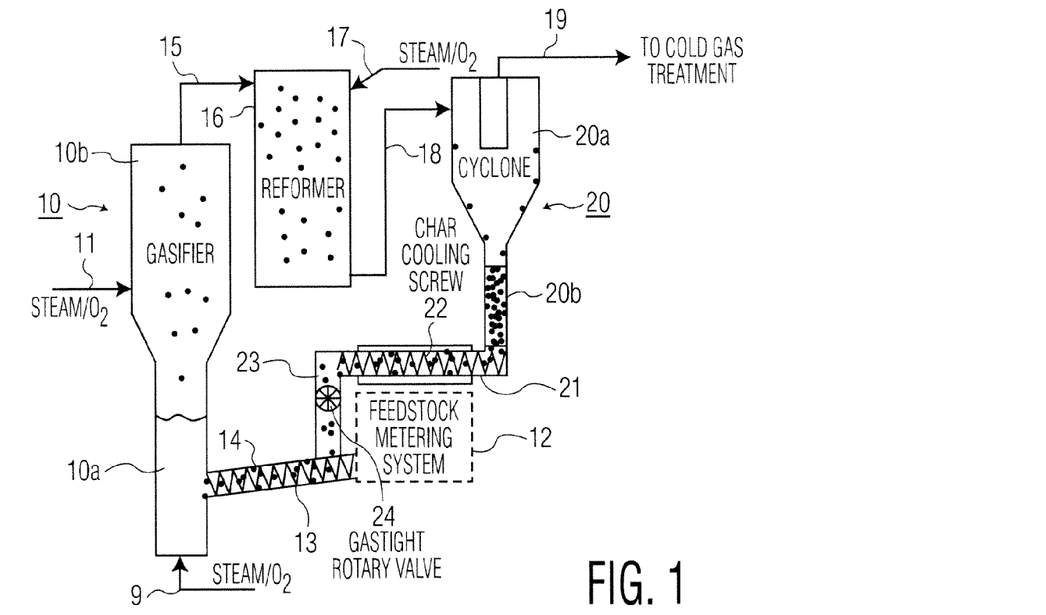
FIG. 1 is a schematic of a first embodiment of the process of the present invention.

Referring now to the drawings, as shown in FIG. 1, a feedstock of biomass is passed from feedstock metering system 12 to line 13, which contains compression screw 14. In line 13, the biomass is admixed with char particles, which were separated from a gas comprising a crude synthesis gas in cyclone 20.

The biomass and char particles are fed by compression screw 14 in line 13 into the fluidized bed section 10a of gasifier 10. Steam and oxygen are fed to the fluidized bed section 10a of gasifier 10 through line 9. The fluidized bed section 10a of gasifier 10 includes an appropriate fluidized bed material, such as alumina, olivine, anthracite, desulfurized petroleum coke, or other refractory materials.

The biomass-rich material is contacted in the fluidized bed section 10a of gasifier 10 with steam and oxygen under conditions that will gasify the biomass-rich material and produce an oxidized biomass, which includes a gas including a primary synthesis gas, or crude synthesis gas, that includes methane and lower alkyl and aromatic compounds, phenolics, tar, and char particles. The primary synthesis gas, or crude synthesis gas, then is passed from the fluidized bed section 10a to the freeboard section 10b of gasifier 10. In the freeboard section 10b, the primary, or crude, synthesis gas is contacted with additional steam and oxygen from line 11 under conditions that provide for conversion and thermal reforming and/or water gas shift of methane, lower alkyl and aromatic hydrocarbons, and phenolics, as well as the tar. As the primary, or crude, synthesis gas is contacted with steam and oxygen and is heated in freeboard section 10b, carbon that is present in the char particles may be gasified and converted into carbon monoxide which becomes part of the synthesis gas. In addition, the gasification of carbon in the char particles makes available catalytically active metal sites on the char particles, which catalyze the reforming and/or water gas shift of methane and lower alkyl and aromatic compounds and phenolics.

Thus, in the freeboard section 10b, the primary or crude synthesis gas produced in the fluidized bed section 10a is subjected to further treatment to produce additional synthesis gas. The resulting product, which includes a crude synthesis gas along with unconverted methane, lower alkyl and aromatic hydrocarbons, phenolics, tar, as well as char particles, is withdrawn from the freeboard section 10b through line 15 and passed to reformer 16, in which the crude synthesis gas, methane, lower alkyl and aromatic hydrocarbons, phenolics, tar, and char particles are contacted with steam and oxygen from line 17, whereby the gas is subjected to further reforming. The char particles catalyze the reforming and/or water gas shift and/or dry reforming reactions.

After the gas has been subjected to reforming and/or water gas shift and/or dry reforming in reformer 16, the gas, which includes a synthesis gas, and the char particles, are withdrawn from reformer 16 through line 18 and passed to cyclone 20. Cyclone 20 includes an upper portion 20a and a lower, or leg portion 20b. In cyclone 20, the char particles are separated from the gas. The gas, which includes synthesis gas, remains in upper portion 20a of cyclone 20, and is withdrawn from upper portion 20a of cyclone 20 through line 19. The gas then is subjected to further treatment to provide a purified synthesis gas.

The char particles settle in the lower, or leg, portion 20b of cyclone 20. The char particles then are passed to line 21, which includes a cooling screw 22, which cools the char particles and passes the char particles to line 23. Line 23 contains a gastight rotary valve 24. The char particles are passed through line 23 and valve 24 to line 14, wherein the char particles become admixed with a biomass-rich material that is fed into line 14 from feedstock metering system 12. Compression screw 13 feeds the biomass-rich material and the char particles to the fluidized bed section 10a of gasifier 10, whereby the char particles are recycled to gasifier 10.

Figure 2:
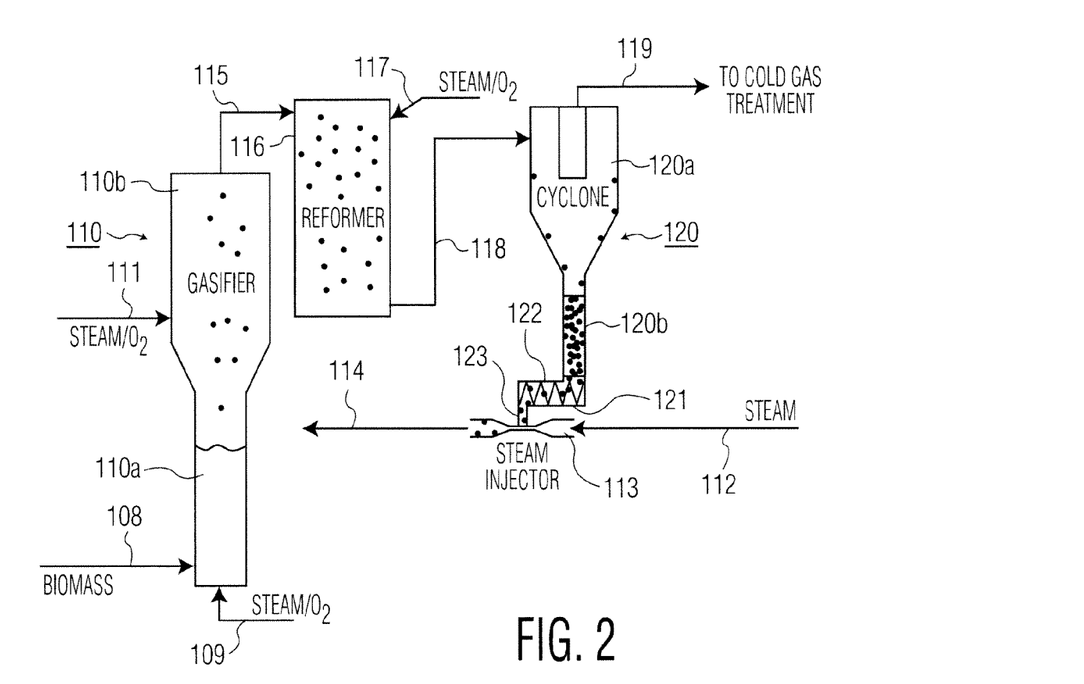
FIG. 2 is a schematic of a second embodiment of the process of the present invention.

In another embodiment, as shown in FIG. 2, a biomass-rich feedstock is fed into the fluidized bed section 110a of gasifier 110 through line 108. Steam and oxygen are fed into fluidized bed section 110a through line 109. Char particles from line 123 are contacted with steam from line 112 in steam injector 113 In general, the char particles are contacted with the steam in steam injector 113 at a temperature of about 150° C. The char particles and the steam and oxygen then are passed from steam injector 113 to line 114. The char particles and steam and oxygen then are fed into the fluidized bed section 110a of gasifier 110. The fluidized bed section 110a of gasifier 110 includes an appropriate fluidized bed material, such as alumina, olivine, anthracite, desulfurized petroleum coke, or other refractory materials.

The biomass-rich material is contacted in the fluidized bed section 110a of gasifier 110 with steam and oxygen under conditions that will gasify the biomass-rich material and produce an oxidized biomass, which includes a gas including a primary synthesis gas, or crude synthesis gas, that includes methane and lower alkyl and aromatic compounds, phenolics, tar, and char particles. The primary synthesis gas, or crude synthesis gas, then is passed from the fluidized bed section 110a to the freeboard section 110b of gasifier 110. In the freeboard section 110b, the primary, or crude, synthesis gas is contacted with additional steam and oxygen from line 111 under conditions that provide for conversion and thermal reforming of methane and lower alkyl and aromatic hydrocarbons, and phenolics, as well as the tar. As the primary, or crude, synthesis gas is contacted with steam and oxygen and is heated in freeboard section 110b, carbon that is present in the char particles may be gasified and converted into carbon monoxide which becomes part of the synthesis gas. In addition, the gasification of carbon in the char particles makes available catalytically active metal sites on the char particles, which catalyze the reforming of lower alkyl and aromatic compounds and phenolics.

Thus, in freeboard section 110b, the primary, or crude synthesis gas produced in the fluidized bed section 110a is subjected to further treatment to produce additional synthesis gas. The resulting product, which includes a crude synthesis gas, along with unconverted methane, lower alkyl and aromatic hydrocarbons, phenolics, tar, as well as char particles, is withdrawn from the freeboard section 110b through line 115 and passed to reformer 116, in which the crude synthesis gas, methane, lower alkyl and aromatic hydrocarbons, phenolics, tar, and char particles are contacted with steam and oxygen from line 117, whereby the gas is subjected to further reforming and/or water gas shift and/or dry reforming. The char particles catalyze the reforming and/or water gas shift and/or dry reforming reactions.

After the gas has been subjected to reforming and/or water gas shift and/or dry reforming in reformer 116, the gas, which includes a synthesis gas, and char particles, are withdrawn from reformer 116 through line 118, and passed to cyclone 120. Cyclone 120 includes an upper portion 120a and a lower, or leg portion 120b. In cyclone 120, the char particles are separated from the gas. The gas, which includes synthesis gas, remains in upper portion 120a of cyclone 120, and is withdrawn from upper portion 120a of cyclone 120 through line 119. The gas then is subjected to further treatment to provide a purified synthesis gas.

The char particles settle in the lower, or leg, portion 120b of cyclone 120. The char particles then are passed to line 121, which includes a cooling screw 122, which cools the char particles and passes the char particles to line 123. The char particles then are passed to steam injector 113, in which the char particles are contacted with steam and oxygen from line 112. The char particles and steam and oxygen then are passed to line 114, and then fed to the fluidized bed section 110a of gasifier 110, whereby the char particles are recycled to gasifier 110.

Figure 3:
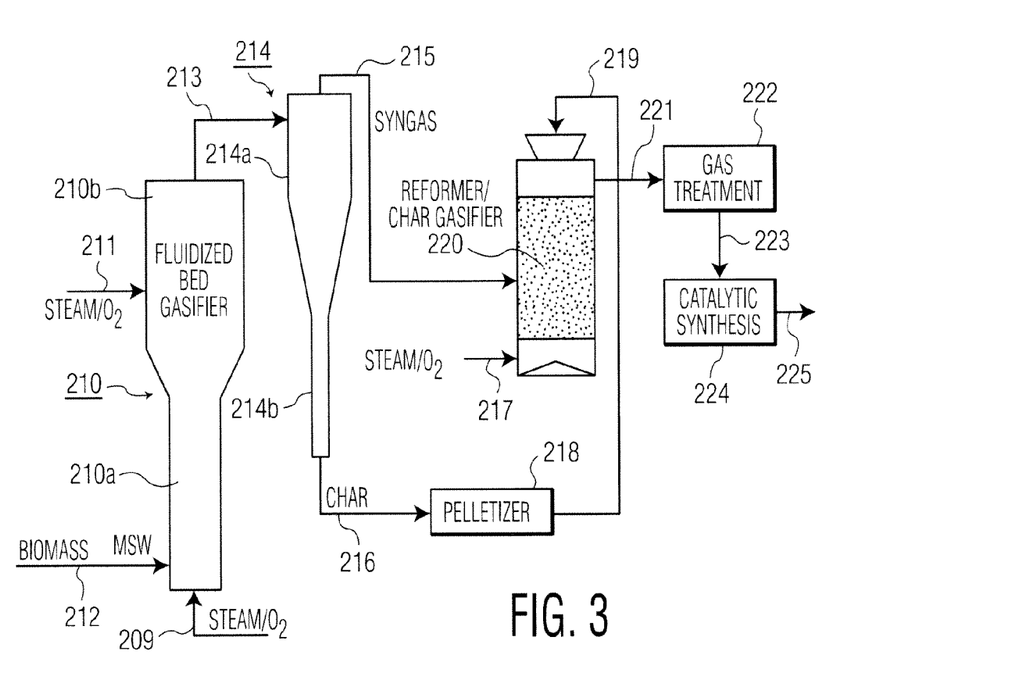
FIG. 3 is a schematic of a third embodiment of the process of the present invention.

In another embodiment, as shown in FIG. 3, a biomass-rich material is fed to the fluidized bed section 210a of gasifier 210 through line 212. Steam and oxygen are fed to the fluidized bed section 210a through line 209. The biomass-rich material is contacted with steam and oxygen in the fluidized bed section 210a under conditions that oxidize the biomass and provide a primary or crude synthesis gas that also includes methane, lower alkyl and aromatic hydrocarbons, phenolics, tar and char particles. The primary, or crude, synthesis gas then is passed to the freeboard section 210b of gasifier 210, and is contacted with steam and oxygen from line 211. In the freeboard section 210b, the primary, or crude, synthesis gas is contacted with the steam and oxygen under conditions which provide for conversion and thermal reforming and/or water gas shift and/or dry reforming of methane, lower alkyl and aromatic hydrocarbons, phenolics, as well as the tar. As the primary, or crude, synthesis gas is contacted with steam and oxygen and is heated in freeboard section 210b, carbon that is present in the char particles may be gasified and converted into carbon monoxide which becomes part of the synthesis gas. In addition, the gasification of the carbon in the char particles makes available catalytically active metal sites on the char particles, which catalyze the reforming and/or water gas shift and/or dry reforming of methane, lower alkyl and aromatic compounds, and phenolics.

After the primary, or crude, synthesis gas is treated in freeboard section 210b, the resulting product, which includes a crude synthesis gas, plus unreacted methane, lower alkyl and aromatic compounds, phenolics, and char particles, is withdrawn from freeboard section 210b through line 213 and passed to cyclone 214. Cyclone 214 includes an upper portion 214a and a lower, or leg portion 214b. In cyclone 214, the crude synthesis gas and the char particles are separated from each other such that the crude synthesis gas remains in upper portion 214a and the char particles remain in the lower, or leg portion 214b. The crude synthesis gas in withdrawn from the upper portion 214a of cyclone 214 through line 215 and passed to reformer 220. The char particles are withdrawn from the leg portion 214b of cyclone 214 through line 216 and passed to pelletizer 218.

In pelletizer 218, the char particles are formed into pellets in order to reduce the pressure drop experienced through the catalyst bed in reformer 220. In a non-limiting embodiment, the pellets have a size of from about 1/16 inch to about 5/8 inch.

After the char particles are pelletized, the char pellets are withdrawn from pelletizer 218 through line 219 and passed into reformer 220.

As noted hereinabove, the crude synthesis gas is passed into reformer 220 through line 215. Stream and oxygen enter reformer 220 through line 217. The crude synthesis gas and the steam and oxygen are passed through reformer 220 in a direction which is countercurrent to that of the char pellets which enter reformer 220 from line 219. Thus the crude synthesis gas and the steam and oxygen are passed over a countercurrent bed of char pellets, whereby the char pellets catalyze the conversion and thermal reforming and/or water gas shift and/or dry reforming of any methane, lower alkyl and aromatic hydrocarbons, and phenolics that are present in the crude synthesis gas. Once the crude synthesis gas has been passed over the countercurrent bed of char particles in reformer 220, the synthesis gas is withdrawn from reformer 220 through line 221, and then passed to gas treatment zone 222.

The treated synthesis gas then is withdrawn from treatment zone 222 through line 223 and passed to catalytic synthesis zone 224, for further processing. The synthesis gas then is withdrawn from catalytic synthesis zone 224 through line 225.

Figure 4:
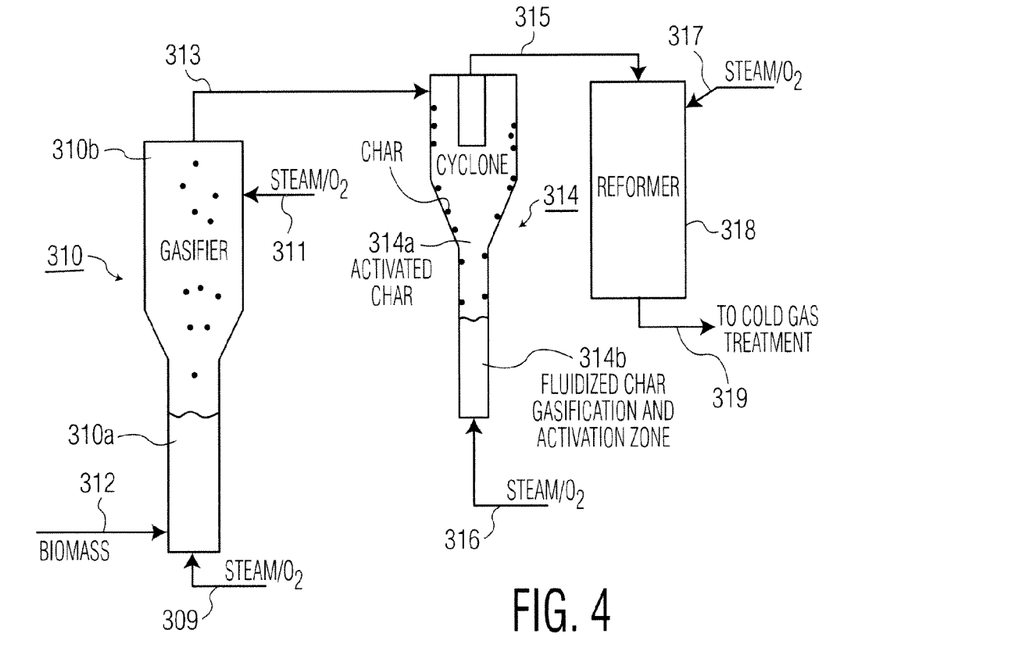
FIG. 4 is a schematic of a fourth embodiment of the process of the present invention.

In yet another embodiment, as shown in FIG. 4, a biomass-rich material is passed from line 312 into the fluidized bed section 310a of gasifier 310. Steam and oxygen are passed into the fluidized bed section 310a through line 309. The biomass-rich material is contacted with oxygen and steam, in the presence of the fluidized bed, in fluidized bed section 310a under conditions that produce a primary, or crude, synthesis gas. The primary, or crude, synthesis gas also includes methane, lower alkyl and aromatic hydrocarbons, phenolics, tar, and char particles.

After the biomass-rich material is gasified in fluidized bed section 310a to produce a primary, or crude, synthesis gas, the primary, or crude, synthesis gas is passed to the freeboard section 310b of gasifier 310. The crude synthesis gas is contacted in freeboard section 310b with steam and oxygen from line 311 under conditions which provide for conversion and reforming and/or water gas shift and/or dry reforming of methane, lower alkyl and aromatic hydrocarbons, phenolics, and tar. In addition, carbon in the char particles may be gasified and converted into carbon monoxide which becomes part of the synthesis gas. In addition, as noted hereinabove, the gasification of carbon in the char particles makes available catalytically active metal sites on the char particles, which catalyze the reforming of the methane, lower alkyl and aromatic hydrocarbons, and phenolics, contained in the crude synthesis gas.

The crude synthesis gas then is withdrawn from the freeboard section 310b of gasifier 310 through line 313 and passed to cyclone 314. Cyclone 314 includes an upper portion 314 and a lower or leg portion 314b. The crude synthesis gas remains in the upper portion 314a of cyclone 314. The char particles settle in the lower, or leg portion 314b of cyclone 314. The char particles then are contacted in leg portion 314b with steam and oxygen from line 316.

The steam and oxygen provide a fluidized bed of char particles in the leg portion 314b of cyclone 314. The steam and oxygen are fed into the leg portion 314b in an amount and at a rate that fluidizes the char particles but does not disrupt the function of the cyclone. The char particles are heated by the steam and oxygen to a temperature that oxidizes the char partially and gasifies carbon in the char, and increases the availability of catalytically active metal sites in the char, but does not deactivate the catalytically active metal sites in the char. In a non-limiting embodiment, the char particles are heated by the steam and oxygen to a temperature of from about 400° C. to about 1000° C. In another non-limiting embodiment, the char particles are heated to a temperature of from about 500° C. to about 900° C. In yet another non-limiting embodiment, the char particles are heated to a temperature of from about 600° C. to about 800° C.

The char particles are contacted with the oxygen and steam in leg portion 314b at an oxygen to steam ratio that is sufficient to maintain an autothermal process while not being too high to deactivate the catalytically active metal sites by oxidation. In a non-limiting embodiment, the char particles are contacted at an oxygen to steam ratio of from about 0.1:1 to about 1:1. In another non-limiting embodiment, the char particles are contacted at an oxygen to steam ratio of from about 0.2:1 to about 0.8:1. In yet another non-limiting embodiment, the char particles are contacted at an oxygen to steam ratio of from about 0.3:1 to about 0.6:1.

In leg portion 314b, carbon in the char particles is gasified, and then may be converted to carbon monoxide, which rises through leg portion 314b and becomes admixed with the synthesis gas in the upper portion 314a of cyclone 314. In addition, the conversion of the carbon in the char increases the catalytically active surface area and grain porosity of the char, and increases the availability of catalytically active metal sites. Once the carbon in the char particles has been gasified, the char particles become more porous, and have lost sufficient density such that they are transported upwardly through leg portion 314b into the upper portion 314a of cyclone 314, whereby the treated char particles are admixed with the crude synthesis gas. The treated char particles and the crude synthesis gas then are withdrawn from the upper portion 314a of cyclone 314 through line 315 and passed to reformer 318.

In reformer 318, the crude synthesis gas and char particles contacted with steam and oxygen from line 317, whereby the methane, lower alkyl and aromatic hydrocarbons and phenolics are converted or subjected to thermal reforming and/or water gas shift and/or dry reforming. The treated char particles catalyze the conversion and reforming and/or water gas shift and/or dry reforming reactions in reformer 318. After the crude synthesis gas has been subjected to reforming and/or water gas shift and/or dry reforming, the synthesis gas then is withdrawn from reformer 319 and subjected to further purification and processing to provide a purified synthesis gas.

Figure 5:
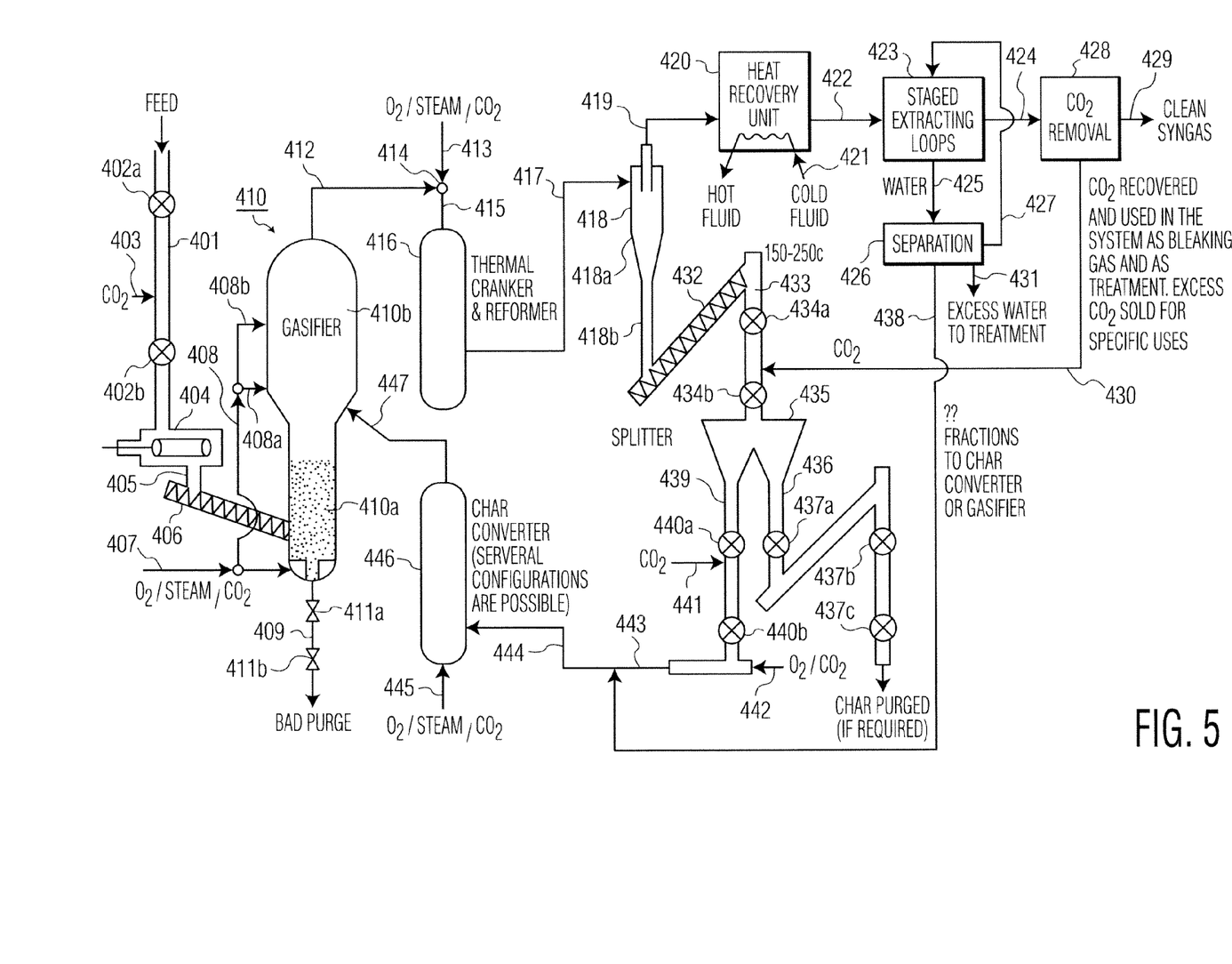
FIG. 5 is a schematic of a fifth embodiment of the process of the present invention.

In another embodiment, as shown in FIG. 5, a feed containing a biomass-rich material is passed through line 401, and flow control valve 402a, and contacted with carbon dioxide from line 403. The biomass-rich material and carbon dioxide in line 401 then are passed through flow control valve 402b in line 401 to conveyer belt 404, and then through line 405 and feed screw 406 to the fluidized bed section 410a of gasifier 410. Steam, oxygen, and carbon dioxide are fed to the fluidized bed section 410a of gasifier 410 from line 407. The fluidized bed section 410a of gasifier 410 includes an appropriate fluidized bed material, such as alumina, olivine, anthracite, desulfurized petroleum coke, or other refractory materials.

The biomass-rich material is contacted in the fluidized bed section 410a of gasifier 410 with steam, oxygen, and carbon dioxide under conditions that will gasify the biomass-rich material and produce an oxidized biomass, which includes a gas including a primary synthesis gas, or crude synthesis gas, that includes methane and lower alkyl and aromatic compounds, phenolics, tar, and char particles. Solid residues which cannot be processed further are withdrawn from the fluidized bed section 410a of gasifier 410 through line 409 and valves 411a and 411b.

The primary synthesis gas, or crude synthesis gas, then is passed from the fluidized bed section 410a to the freeboard section 410b of gasifier 410. As the crude synthesis gas is passed from the fluidized bed section 410a to the freeboard section 410b, the crude synthesis gas is contacted with activated char particles and a crude synthesis gas from line 447, and with oxygen, steam, and carbon dioxide, which is passed from line 407 to line 408, and enters the freeboard section 410b from lines 408a and 408b.

In the freeboard section 410b, the primary, or crude, synthesis gas, is contacted with the oxygen, steam, and carbon dioxide from lines 408a and 408b and in the presence of the activated char particles from line 447, under conditions that provide for the conversion and thermal reforming of methane, lower alkyl and aromatic hydrocarbons, and phenolics, as well as the tar.

As the primary, or crude, synthesis gas from the fluidized bed section 410a and from line 447 is contacted with steam, oxygen, and carbon dioxide and is heated in freeboard section 410b, carbon that is present in the char particles formed in fluidized bed section 410a may be gasified and converted into carbon monoxide which becomes part of the synthesis gas. In addition, the gasification of carbon in the char particles that were formed in fluidized bed section 410a makes available catalytically active sites, such as catalytically active metal sites, on the char particles, which catalyze the reforming of methane and lower alkyl and aromatic compounds and phenolics. In addition, the activated char particles, which along with crude synthesis gas, enter the gasifier 410 from line 447, also include catalytically active sites, and also catalyze the reforming of methane and lower alkyl and aromatic compounds and phenolics.

Thus, in freeboard section 410b, there are contained activated char particles which were passed to gasifier 410 from line 447, and activated char particles formed by gasifying carbon in the char particles formed as a result of gasifying the biomass-rich material in fluidized bed section 410a. Both types of char particles catalyze the reforming of methane and lower alkyl and aromatic compounds and phenolics.

Thus, in the freeboard section 410b, the primary or crude synthesis gas produced in the fluidized bed section 410a, and the crude synthetic gas which enters the gasifier 410 from line 447, are subjected to further treatment to produce additional synthesis gas. The resulting product, which includes a crude synthesis gas along with unconverted methane, lower alkyl and aromatic hydrocarbons, phenolics, tar, and char particles, is withdrawn from the freeboard section 410b through line 412, and combined with oxygen, steam, and carbon dioxide from line 413 at junction 414, and the combined stream of crude synthesis gas, char particles, oxygen, steam, and carbon dioxide then is passed through line 415 to reformer 416, whereby the crude synthesis gas is subjected to further reforming. The char particles catalyze the reforming and/or water gas shift and/or dry reforming reactions.

After the gas has been subjected to reforming and/or water gas shift and/or dry reforming in reformer 416, the gas, which includes a synthesis gas, and the char particles, are withdrawn from reformer 416 through line 417 and passed to cyclone 418. Cyclone 418 includes an upper portion 418a and a lower, or leg portion 418b. In cyclone 418, the char particles are separated from the gas. The gas, which includes synthesis gas, remains in upper portion 418a of cyclone 418, and is withdrawn from upper portion 418a of cyclone 418 through line 419, and is passed to heat recovery unit 420.

In heat recovery unit 420, the gas is cooled by passing a cold fluid into heat recovery unit 420 through line 421, whereby the cold fluid in line 421 cools the gas, and the cold fluid exits the heat recovery unit 420 as a hot fluid. Upon cooling, the gas is withdrawn from heat recovery unit 420 through line 422, and passed through a series of staged scrubbing loops, indicated schematically as 423, whereby the gas is scrubbed with alkaline water, and impurities are removed from the synthesis gas. Such impurities include contaminants such as metals, tars, and fine particles. Water and the impurities mentioned hereinabove are withdrawn from the staged scrubbing loops 423 through line 425 and passed to separator 426. A tar rich fraction is withdrawn from separator 426 through line 438, and water is withdrawn from separator 426 through line 427 and recycled to the staged scrubbing loops 423. Any excess water is withdrawn from separator 426 through line 431.

The scrubbed synthesis gas is withdrawn from the staged scrubbing loops 423 through line 424 and is passed to $CO_2$ removal zone 428, whereby carbon dioxide is removed from the synthesis gas, and is withdrawn from $CO_2$ removal zone 428 through line 430. A clean synthesis gas is withdrawn from $CO_2$ removal zone 428 through 429.

As the crude synthesis gas is being cleaned and purified after being withdrawn from cyclone 418, the char particles settle in the lower, or leg, portion 418b of cyclone 418. The char particles then are passed through a conveyor screw 432 to line 433. The char particles then are passed through control valve 434a, after which they are mixed with carbon dioxide from line 430. The combined stream of char particles and carbon dioxide in line 433 then is passed through control valve 434b and passed to splitter 435.

In splitter 435, char particles which are not suitable for further processing are withdrawn from splitter 435 through line 436, and passed through control valves 437a, 437b, and 437c and purged in order to prevent unwanted accumulation of char particles in the system. Char particles which are to be subjected to further treatment are withdrawn from splitter 435 through line 439, and passed through control valve 440a, after which the char particles are contacted with carbon dioxide from line 441. The combined stream of char particles and carbon dioxide in line 439 is passed through control valve 440b, and then is contacted with oxygen and carbon dioxide from line 442. A combined stream of char particles, oxygen, and carbon dioxide then passes through line 443, and then the char particles, oxygen, and carbon dioxide are mixed with the tar rich fraction from line 438, to form a combined stream of char particles, oxygen, carbon dioxide, and the tar rich fraction in line 444.

The combined stream of char particles, tar rich fraction, oxygen, and carbon dioxide in line 444 is passed to a char activation zone, in the form of char activation zone 446, which, in a non-limiting embodiment, may be in the form of a fluidized bed reactor. Char activation zone 446 contains a fluidized bed of materials which may be particles of petroleum coke, hard coal, aluminum, or olivine, or mixtures thereof. In general, the particles of the fluidized bed have a particle size of from about 100 microns to about 200 microns.

In the char activation zone 446, the char particles, tar rich fraction, oxygen, and carbon dioxide also are contacted with oxygen, steam, and carbon dioxide from line 445.

Char activation zone 446 is operated under conditions to provide a crude synthesis gas and to activate the char particles by exposing catalytically active sites on the char particles. In general, the char activation zone 446 is operated at a temperature of from about 400° C. to about 1,200° C. In a non-limiting embodiment, the char activation zone 446 is operated at a temperature of from about 500° C. to about 900° C. In another non-limiting embodiment, the char activation zone 446 is operated at a temperature of from about 600° C. to about 800° C.

Thus, in char activation zone 446, there is produced a crude synthesis gas formed as a result of reacting the tar rich fraction, oxygen, steam, carbon dioxide, and the carbon in the char particles. In char activation zone 446, at least a portion of the carbon in the char particles is gasified and converted to carbon monoxide and thus becomes part of a crude synthesis gas. Furthermore, as the carbon in the char particles is gasified, catalytic materials contained in the char particles, such as the catalytic elements and salts hereinabove described, become exposed on the surface of the char particles. Thus, the char particles have become activated in char activation zone 446, and thus may catalyze the conversion of tar, low molecular weight alkyl and aromatic hydrocarbons, phenolics, and other components produced as a result of the gasification of a biomass-rich material in the fluidized bed section 410a of gasifier 410.

Upon the gasification and conversion of at least a portion of the carbon in the char particles, to provide activated char particles and the formation of a crude synthesis gas in char activation zone 446, the activated char particles and crude synthesis gas are withdrawn from char activation zone 446 through line 447, and passed to gasifier 410, whereby the activated char particles and crude synthesis gas produced in char activation zone 446 enter gasifier 410 at a point above fluidized bed section 410a. Thus, in gasifier 410, the crude synthesis gas and activated char particles formed in char activation zone 446 become admixed with the crude synthesis gas and char particles that were produced in fluidized bed section 410a. The crude synthesis gas produced in fluidized bed section 410a and the crude synthesis gas produced in char activation zone 446 are admixed to form a crude synthesis gas which is subjected to reforming in the freeboard section 410b. In freeboard section 410b, the char particles that were formed in fluidized bed section 410a are heated such that at least a portion of the carbon in such char particles is gasified, thereby exposing catalytically active sites on such char particles. Such char particles, along with the activated char particles produced in char activation zone 446, provide for increased conversion of the tar, low molecular weight alkyl and aromatic hydrocarbons, phenolics and other components in the combined crude synthesis gas produced in fluidized bed section 410a and char activation zone 446.

The invention now will be described with respect to the following examples; it is to be understood, however, that the scope of the present invention not intended to be limited thereby.

EXAMPLE 1

The catalytic effect of MSW char on hydrocarbon and tar conversion was studied by passing a synthesis gas (syngas) containing carbon monoxide, hydrogen, carbon dioxide, steam, hydrocarbons and tar, through a packed bed of MSW char and alumina at elevated temperatures. The syngas used in these experiments was produced from the gasification of carbon rich residual materials in a fluidized bed gasifier at 650-750° C. A slip stream of syngas was run directly from the gasifier to the reformer and had a steam content of 25% (volume). The char used in the packed bed contained carbon and a mix of metals and other elements (see Table 1) and was produced by the gasification of municipal solid wastes in the same fluidized bed gasifier at 650-750° C. The particle size distribution of the char used for the tests was in the range of 10-100 microns. The particle size of the alumina was 500 microns. The concentration of char was approximately 75 kg of char per cubic meter of packed bed reactor. The gas residence time in the reactor was 1 second. The reactor used for these tests was an alumina tube (1 inch inner diameter) heated with an electrical tube furnace.

TABLE 1

Composition of char produced from the gasification of MSW from ICP-MS analysis

| Element | Concentration (mg/kg) |
|---|---|
| Silicon | 154000 |
| Calcium | 60880 |
| Aluminum | 53980 |
| Iron | 22360 |
| Potassium | 8758 |
| Titanium | 8182 |
| Magnesium | 5330 |
| Copper | 3292 |
| Zinc | 1528 |
| Manganese | 969 |
| Barium | 949 |
| Lead | 423 |
| Nickel | 273 |
| Tin | 272 |
| Strontium | 259 |
| Chromium | 248 |

Figure 6:
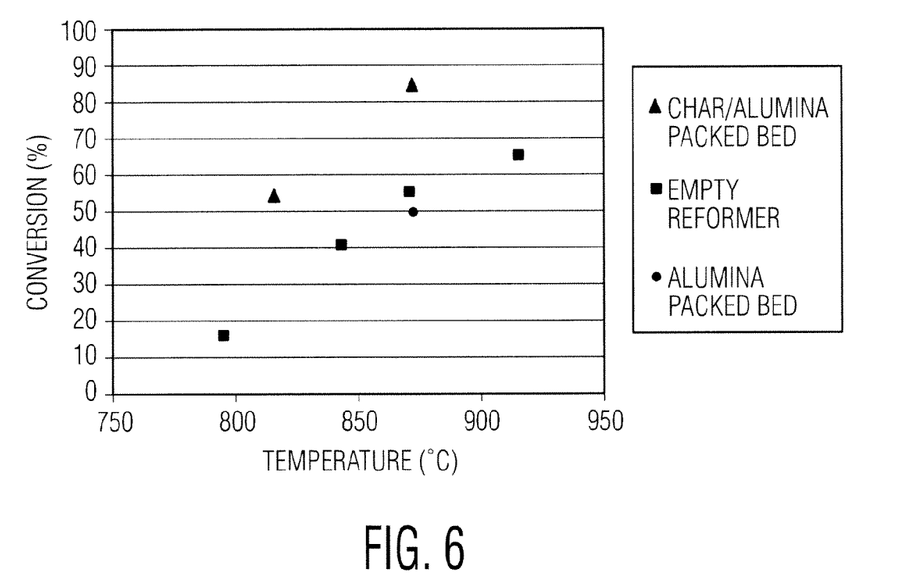
FIG. 6 is a graph showing the conversion of tar in a crude synthesis gas at various temperatures in a reformer containing a packed bed of char particles.

The tar conversion was calculated from gravimetric tar measurement. The tar was captured from the gas before and after the reformer with spargers filled with ispropanol at −4° C. The isopropanol then was evaporated before the tar could be weighed. It is expected that the tar measured through this method was missing a portion of the lighter tars, namely benzene. FIG. 6 compares the conversion of tar for a series of tests at different temperatures in a packed bed containing a mix of MSW char and alumina to the conversion obtained in an empty reformer. These results show that the conversion of tar is significantly higher at two temperatures with a packed bed of char/alumina as compared to an empty reformer. A control test shows that the conversion is not better with a simple packed bed of alumina than with an empty reformer, confirming that the increased activity is due to the char and not the alumina.

Figure 7:
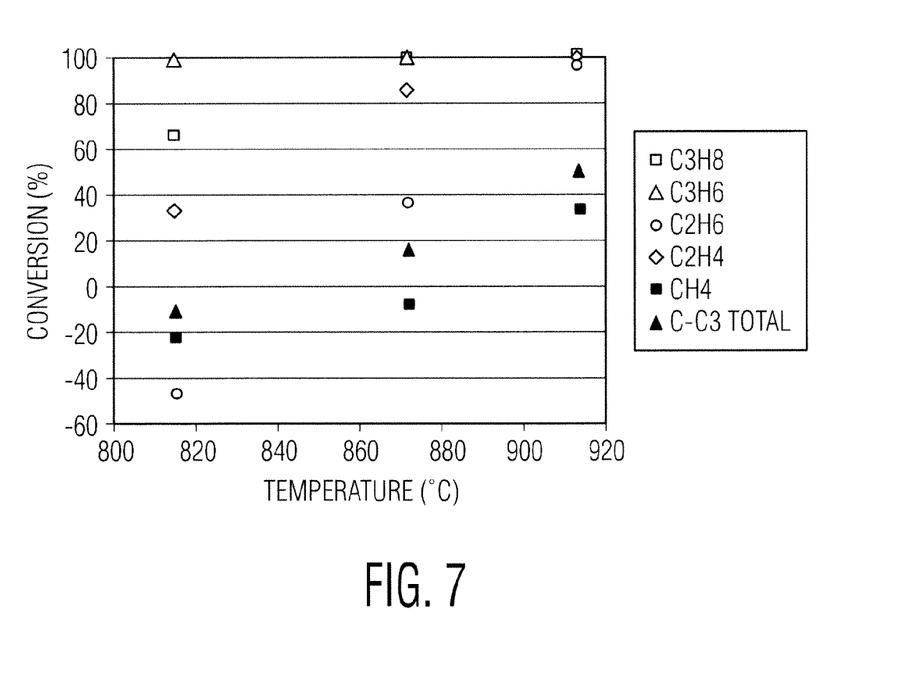
FIG. 7 is a graph showing the conversion of hydrocarbons in a crude synthesis gas with steam at various temperatures in a reformer containing a packed bed of char particles.
Figure 8:
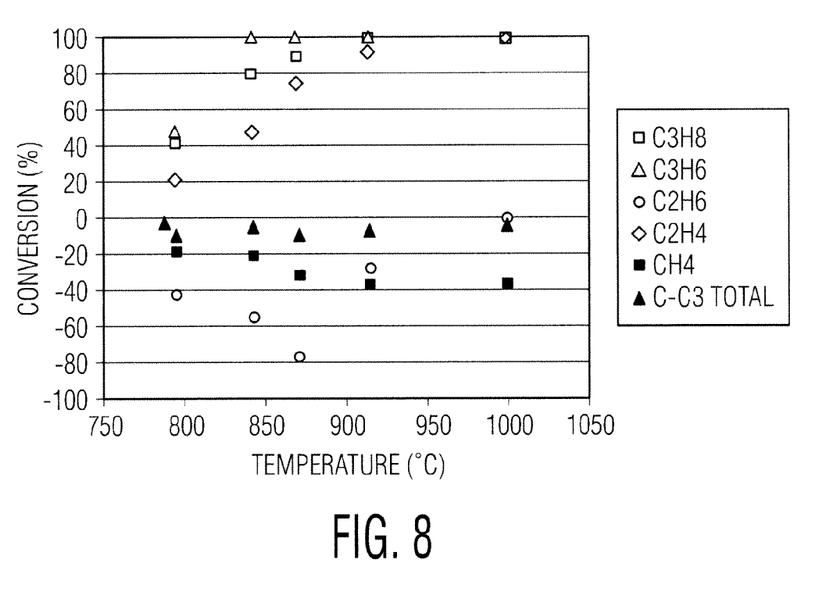
FIG. 8 is a graph showing the conversion of hydrocarbons in a crude synthesis gas with steam at various temperatures in an empty reformer.

The conversion of hydrocarbon gases ($C_1$ to $C_3$) was calculated using gas chromatography composition data from gas samples taken before and after the gas was passed through the reformer. FIG. 7 and FIG. 8 compare the conversion of hydrocarbon gases with and without a fixed bed of char/alumina for different temperatures. The results show that propane, propylene, and ethylene are converted totally at lower temperatures in a fixed bed of char as compared to an empty reformer. In addition, the conversion of ethane is near 100% at 920° C. with a fixed bed of char, while the conversion was null at 1000° C. with an empty reformer. The results also show that the conversion of methane is nearly 35% at 915° C. with a packed bed of char, while there was still a 35% conversion in an empty reformer at 1000° C.

EXAMPLE 2

Figure 9:
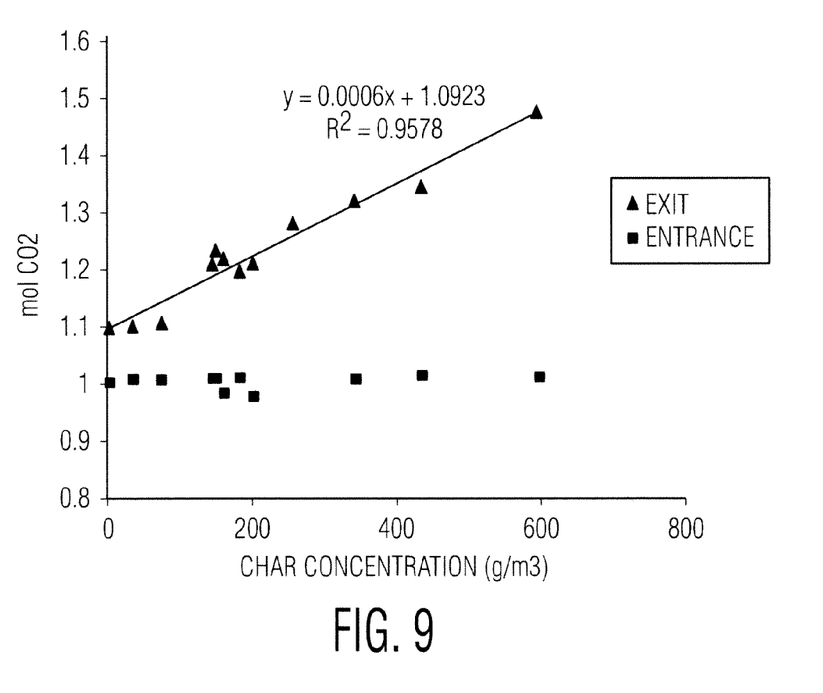
FIG. 9 is a graph showing moles of $CO_2$ at the entrance and exit of a reformer for various concentrations of char particles in a reformer at 940° C.
Figure 10:
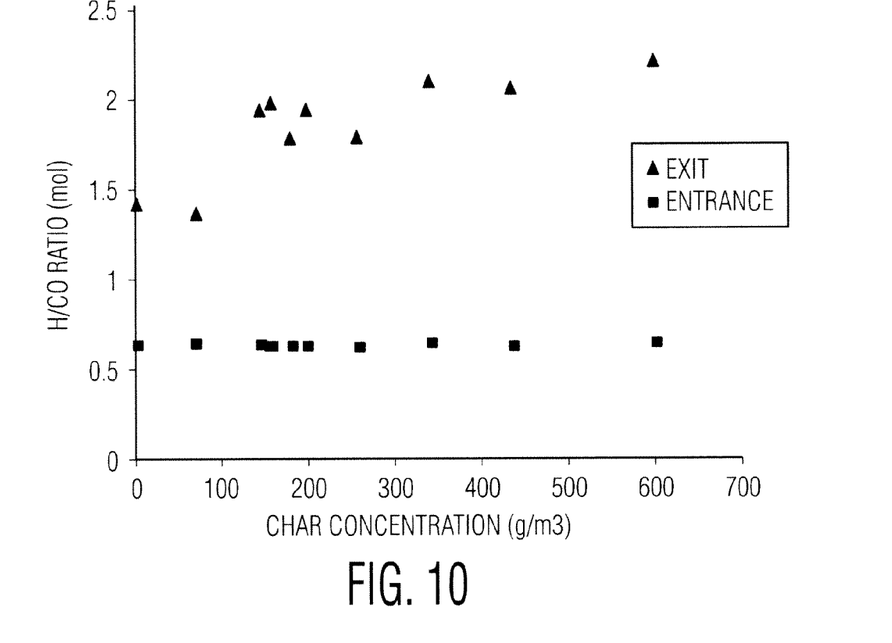
FIG. 10 is a graph showing the $H_2/CO$ ratio at the entrance and exit of a reformer containing various concentrations of char particles at 940° C.
Figure 11:
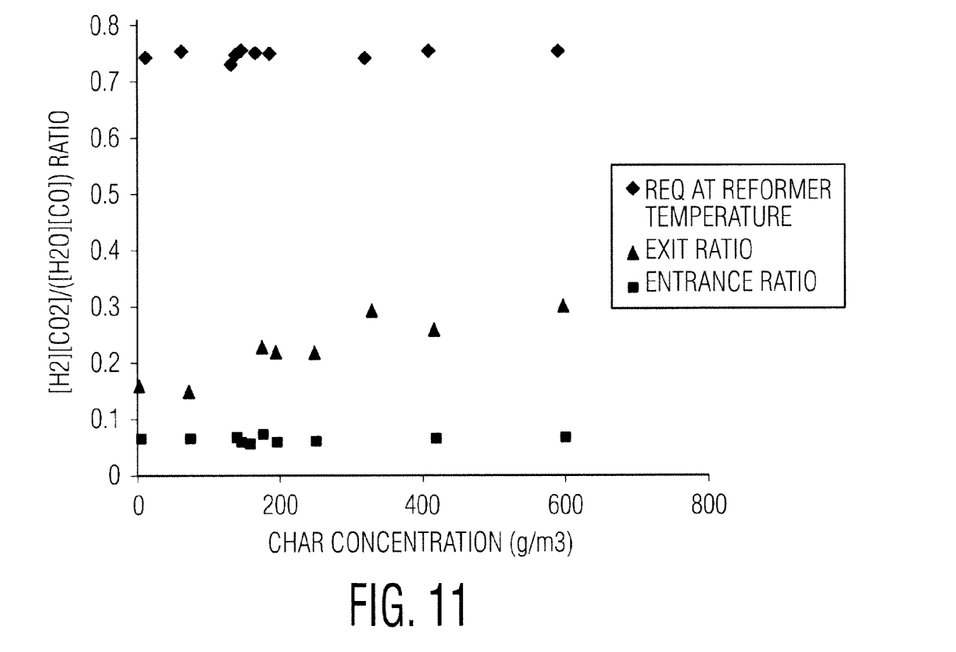
FIG. 11 is a graph of the $(H_2*CO_2)/(H_2O*CO)$ ratio at the entrance and exit of a reformer at 940° C. for various concentrations of transported char.

The catalytic effect of MSW char on the water gas shift reaction was tested by passing syngas in the above described reformer for various concentrations of char. During these tests, the char was present in the reformer as transported char. The syngas was of a similar composition as for the reforming tests described above, but it was fed from a pressurized bottle, contained no tar, and steam was added to a concentration of 65% (volume). The only parameter that varied during this series of tests was the concentration of transported char. The water gas shift conversion was evaluated primarily through the production of $CO_2$, assuming that $CO_2$ was produced only through the water gas shift reaction. Other $CO_2$ sources could have been from the reverse Boudouard reaction and/or from the carboreduction of metal oxides present in the char. The former can be excluded because it is not favored thermodynamically at the temperature of the test (940° C.). At such temperature the $CO/CO_2$ ratio at the Boudouard equilibrium is 4900, while the experimental $CO/CO_2$ ratio was around 0.5. The latter is shown not to be a significant source of $CO_2$ during subsequent reduction tests. FIG. 9 shows that the production of $CO_2$ increases with the concentration of char. The increase in the $H_2/CO$ ratio is also an indication of the increase in forward water gas shift conversion (although it can have other causes, such as methane reforming for example). FIG. 10 shows an increase in $H_2/CO$ ratio as the concentration of transported char increases. An increase in the water gas shift ratio $(H_2*CO_2)/(H_2O*CO)$ toward equilibrium also is an indication of the increase in forward water gas shift conversion (although the water gas shift reaction cannot be isolated as the only cause in this case). FIG. 11 shows an increase in the water gas shift ratio $(H_2*CO_2)/(H_2O*CO)$ toward equilibrium as the concentration of transported char increases.

EXAMPLE 3

Further tests are performed to confirm the results showing catalytic activity of MSW char for reforming and water gas shift reaction and to provide better comprehension of the mechanism and characteristics of char associated with this catalytic activity. Char made from the gasification of residual products such as MSW and ICI is a complex mix of carbon, metals and other constituents and it is necessary from an industrial point of view to develop characterization tools to predict, and improve, its catalytic activity. The tests are performed in a fluidized bed of char to facilitate the control of experimental conditions and the characterization of the char. A mix of gases comprising $H_2$, CO, $CO_2$, $H_2O$, and $CH_4$ representative of steam/$O_2$ gasification is preheated before being fed to the fluidized bed char reactor. The fluidized bed reactor is heated electrically in a tube furnace. Water gas shift conversion and methane conversion are measured at various temperatures in the 800-1000° C. range for a variety of char preparations. The following characterizations are performed on each char preparation before, during, and after the tests: surface area and pore size distribution with BET adsorption, isotherm, surface composition with XPS, pores and surface morphology and surface composition mapping with SEM/EDS, metal oxides with XRD, particle size distribution with laser diffraction, bulk metal composition with ICP-MS, CHON elemental analysis and bulk density. Gas composition before and after being passed through the reformer is measured with a gas chromatographer and humidity is measured with dew-point moisture sensors. A series of tests with DRIFT in-situ analysis are performed to identify the species adsorbed on the char's surface for a range of conditions varying from oxidizing to reducing atmospheres, as well as for various steam to carbon gas ratios.

The first char preparation tested is obtained from MSW with metal removed through acid washing at various severities. The comparison of the data with unwashed MSW char (complete with metal composition data) provides evidence that the catalytic activity for reforming and water gas shift is dependent on the mix of metals present in the MSW char. A correlation between the metal concentration and the water gas shift and reforming activity is established for this char.

For the second char preparation, the metal leachate from the MSW char washing is used to deposit metals on a low metal content activated carbon, which results in a significant increase in the catalytic activity of the activated carbon for water gas shift reaction and methane reforming. Deposition of individual metals, such as iron, copper, nickel and manganese, as well as combination of them matches in most cases the correlation concentrations and effect interactions observed for MSW and ICI chars (see fourth char preparation below).

The third char preparation tested comprises MSW char subjected to carbon conversion with steam and steam/$O_2$. Some chars also are submitted to a reduction with hydrogen prior to testing their catalytic activity. This activation process increases the availability of the catalytic metal sites by increasing the surface area of the char and by reducing the carbon encapsulation of the catalytically active metal sites. BET surface data confirm the pore formation effect of the burn-off. SEM/EDS, XPS and XRD results confirm that more metal was exposed on the surface after activation. The results (complete with the surface area, pore size distribution, particulate size distribution, bulk density, pore morphology as well a surface composition mapping data) show that the availability of the metals associated with high surface area and low carbon encapsulation of the catalytically active metal sites affect the catalytic activity and that such activity could be increased through the activation processes tested. The catalytic activity of active char also is increased further when a reduction with $H_2$ was performed prior to the test. Char particles are activated with different oxygen to steam ratios while the temperature and the final burn-off ratio are kept constant. The activation with the lower oxygen to steam ratio takes longer to reach the same burn-off ratio, due to the higher reaction rate of carbon with $O_2$ than of carbon with $H_2O$ and $CO_2$. But, when the $H_2$ reduction step is skipped, the chars that are activated in a less oxidizing atmosphere show a higher initial catalytic activity. When samples of activated char are washed with acid, significantly more metals are leached from the char, which confirms the increased availability of the metal sites after activation.

The fourth char preparation comprises various chars made from the gasification of many MSW and ICI waste materials. These chars are prepared to have various concentrations of transition, alkali, and alkali earth metals by mixing various types of feedstock so that it was possible to establish correlations between the catalytic activity and the concentration of these metals, as well as interaction effects. These chars are prepared in conditions representative of steam/$O_2$ gasification to see if metal composition alone could be used to predict char activity without other char pre-treatments following gasification. Results show that high concentrations of iron, copper, calcium, potassium, magnesium, and manganese, which are common in such waste products, are associated with higher catalytic activity. Tests are performed with chars produced from a large number of different wastes to evaluate how metal content and other elements could be used to predict catalytic activity independently of other properties.

The complexity of MSW and ICI char structure and composition makes it difficult to determine the mechanism by which catalytic reforming and water gas shift reactions occur. It is accepted largely by those skilled in the art that reforming of methane on transition metal catalytic sites involves the dissociative chemisorptions of methane, and form activated adsorbed CHx species and liberating gaseous $H_2$. $H_2O$ and $O_2$ also are known to undergo dissociative adsorption on the metal sites, where adsorbed oxygen and hydroxide react with adsorbed carbon species to form CO. Aluminum oxide catalyst supports are recognized to play an active role in the catalytic steps, as it participates in the adsorption of oxidative species that move to the metal/support interface to react with the adsorbed carbon. Silicon oxide supports on the other hand generally are not believed to play a direct role in catalytic steps. Various promoters, such as lanthanum, cerium, and magnesium often are added to the catalyst to increase activity, stability, and resistance to coke formation. It has been observed that certain carbides have inherent catalytic activity, namely molybdenum and tungsten carbides. The DRIFT analysis shows the presence of various metal carbides on the surface of many tested MSW and ICI chars. These carbides may play a role in the catalytic process and this should be studied in further tests. Magnesium oxide, which is present in many MSW and ICI chars, also has been shown to include a catalyst for reforming.

EXAMPLE 4

Char is separated from a synthesis gas in a cyclone. A column of char with a sufficient height to prevent direct gas flow through the bottom of the cyclone is maintained in the leg of the cyclone. A feeding screw at the bottom of the leg of the cyclone regulates the height of the char column and feeds the char to a char fluidized bed. In the char fluidized bed, the carbon in the char is gasified with steam (or $CO_2$ or a mixture of steam and $CO_2$) and oxygen. The gasification of the carbon in the char is autothermal, and increases the conversion of the carbon in the char to syngas ($H_2$ and CO), and increases the activity per mass unit of char. The gas velocity is controlled to be over the minimum fluidization velocity of the larger and heavier particulate, which, for example, is 0.027 m/sec. for a particulate having a density of 1,500 kg/m$^3$ with a mix of 70 vol. % steam and 30 vol. % oxygen at 800° C. The gas velocity also is adjusted to transport the char particles out of the fluidized bed after a sufficient amount of carbon in the char particles has been gasified, thereby activating the char particles. For example, for particles with a particulate sphericity of 0.6, a fluidization gas of 70 vol. % steam and 30 vol. % oxygen, a temperature of 800° C., a pressure of 15 psig, a particulate density of 500 kg/m$^3$, and a particulate diameter of 50 microns, the terminal velocity is 0.057 m/sec. By selecting a terminal velocity in relation to a sufficiently small particulate size and/or sufficiently high porosity of the char particles, the char particles will be transported outside the fluidized bed vessel along with syngas. The mix of syngas and activated char particles then is fed directly to the main gasifier just above the fluidized bed section. Through such char recirculation, the activated char loading in the reforming, or freeboard, section is increased sufficiently to improve the conversion of methane, tar, and other light hydrocarbon gases through reforming reactions, as well as increase water gas shift reaction activity.

A purge of particulates is performed in order to prevent the excessive accumulation of an inert fraction of char in the system. This purge can be done at the bottom of the char fluidized bed through a lock hopper system or through a low efficiency cyclone between the char fluidized bed and the gasifier. A portion of the inert material in the char also is purged through the action of the main cyclone as the particulates that become sufficiently small will pass through the main cyclone without being separated and will be removed in downstream scrubbing units. In addition to increasing the concentration of activated char in the reforming section, this example provides an increased conversion of carbon in the char to syngas, thereby increasing the total yield of syngas.

The disclosures of all patents and publications (including published patent applications) are hereby incorporated by reference to the same extent as if each patent and publication were incorporated individually by reference.

It is to be understood, however, that the scope of the present invention is not to be limited to the specific embodiments described above. The invention may be practiced other than as particularly described and still be within the scope of the accompanying claims.

What is claimed is:

1. A method of producing synthesis gas from biomass, comprising:
   (a) gasifying a biomass-rich material in a gasifier under conditions which produce a product comprising a gas comprising a crude synthesis gas and char particles, wherein said char particles comprise carbon and at least one catalytically active material;
   (b) separating such char particles from said gas comprising a crude synthesis gas;
   (c) passing said char particles to a char activation zone, wherein said char particles are contacted with steam or with oxygen and steam or with air or with oxygen enriched air or with carbon dioxide or any mixtures thereof in said char activation zone, and are heated to a temperature of from about 400° C. to about 1,200° C. to provide activated char particles; and
   (d) passing said activated char particles to said gasifier.

2. The method of claim 1 wherein said char particles are heated in said char activation zone to a temperature of from about 500° C. to about 900° C.

3. The method of claim 2 wherein said char particles are heated in said char activation zone to a temperature of from about 600° C. to about 800° C.

4. The method of claim 1 wherein from about 10 wt. % to about 95 wt. % of the carbon in the char particles is gasified in said char activation zone.

5. The method of claim 4 wherein from about 20 wt. % to about 40 wt. % of the carbon in the char particles is gasified in said char activation zone.

6. The method of claim 1 wherein said char particles are contacted with oxygen and steam in said char activation zone.

7. The method of claim 1 wherein said char particles are contacted with oxygen, steam, and carbon dioxide in said char activation zone.

8. The method of claim 1 wherein said at least one catalytically active material is selected from the group consisting of calcium, magnesium, silicon, aluminum, iron, sodium, potassium, titanium, copper, zinc, manganese, barium, nickel, strontium, lead, chromium, potassium salts, nickel salts, iron salts, and mixtures thereof.

9. A method of producing synthesis gas from biomass, comprising:
   (a) gasifying a biomass-rich material in a gasifier under conditions which produce a product comprising a gas comprising a crude synthesis gas and char particles, wherein said char particles comprise carbon and at least one catalytically active material;
   (b) separating said char particles from said gas comprising a crude synthesis gas;
   (c) contacting said char particles with steam or with oxygen and steam or with air or with oxygen enriched air or with carbon dioxide or with any mixture thereof, and heating said char particles to a temperature of from about 400° C. to about 1,200° C. to provide activated char particles; and (d) passing said gas comprising a crude synthesis gas and said activated char particles to a reforming zone, whereby said gas comprising a crude synthesis gas is subjected to steam reforming and/or water gas shift and/or dry reforming in the presence of said activated char particles.

10. The method of claim 9 wherein said char particles are heated to a temperature of from about 500° C. to about 900° C.

11. The method of claim 10 wherein said char particles are heated to a temperature of from about 600° C. to about 800° C.

12. The method of claim 8 wherein, in step (c), from about 10 wt. % to about 95 wt. % of the carbon in the char particles is gasified.

13. The method of claim 12 wherein, in step (c), from about 20 wt. % to about 40 wt. % of the carbon in the char particles is gasified.

14. The method of claim 8 wherein, in step (c), said char particles are contacted with oxygen and steam.

15. The method of claim 8 wherein, in step (c), said char particles are contacted with oxygen, steam, and carbon dioxide.

16. The method of claim 8 wherein said at least one catalytically active material is selected from the group consisting of calcium, magnesium, silicon, aluminum, iron, sodium, potassium, titanium, copper, zinc, manganese, barium, nickel, strontium, lead, chromium, potassium salts, nickel salts, iron salts, and mixtures thereof.

\* \* \* \* \*